US012033476B1

(12) United States Patent
Park et al.

(10) Patent No.: US 12,033,476 B1
(45) Date of Patent: Jul. 9, 2024

(54) CASSETTE HOLDER FOR AUTOMATED TELLER MACHINE

(71) Applicant: HYOSUNG TNS INC., Seoul (KR)

(72) Inventors: Sung Ho Park, Seoul (KR); Chang Ho Seo, Seoul (KR); Hyun Soo Jang, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/296,829

(22) Filed: Apr. 6, 2023

(30) Foreign Application Priority Data

Dec. 29, 2022 (KR) ........................ 10-2022-0189660
Feb. 14, 2023 (KR) ........................ 10-2023-0019438

(51) Int. Cl.
*G07F 19/00* (2006.01)

(52) U.S. Cl.
CPC .................................. *G07F 19/201* (2013.01)

(58) Field of Classification Search
CPC ..................................................... G07F 19/201
USPC .......................................................... 235/379
See application file for complete search history.

(56) References Cited

U.S. PATENT DOCUMENTS 5,357,385 A * 10/1994 Shimizu ........... G11B 15/67536 360/96.51
5,386,329 A * 1/1995 Ikegawa .......... G11B 15/67549 360/95
5,566,037 A * 10/1996 Kasai ................... G11B 25/063
5,615,066 A * 3/1997 Shibata ............ G11B 15/67549 360/96.51

* cited by examiner

*Primary Examiner* — Daniel A Hess
(74) *Attorney, Agent, or Firm* — BACON & THOMAS, PLLC

(57) ABSTRACT

Provided is a cassette holder for an automated teller machine. An embodiment of the cassette holder for the automated teller machine includes a first holding part configured to hold a first cassette having a predetermined volume, and a second holding part in which the first holding part is connected to an inner side thereof, and configured to hold a second cassette having a larger volume than the first cassette, wherein the first holding part is moved in a front-rear direction between a first position in which the first holding part is positioned at a front side of the second holding part to hold the first cassette on the first holding part and a second position in which the first holding part is positioned at a rear side of the second holding part to hold the second cassette on the second holding part.

15 Claims, 23 Drawing Sheets

[FIG.1]
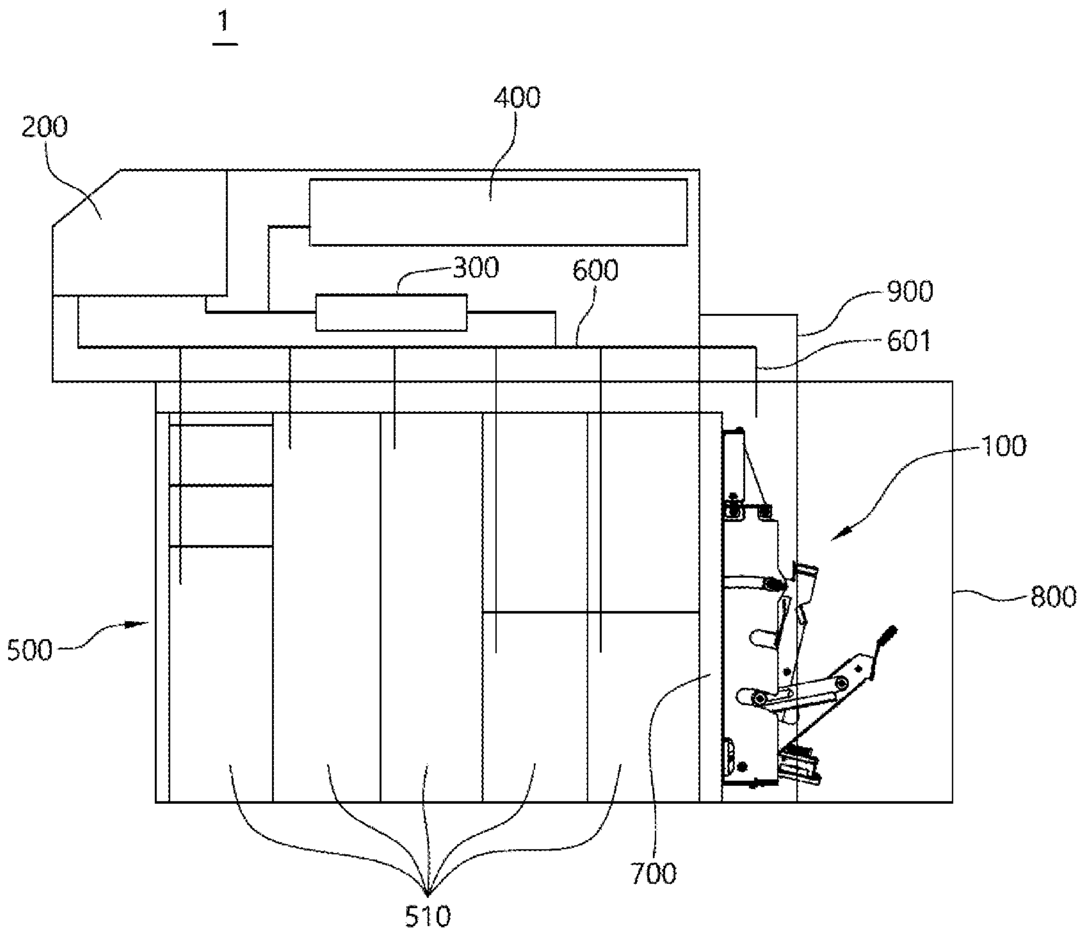

[FIG.2A]
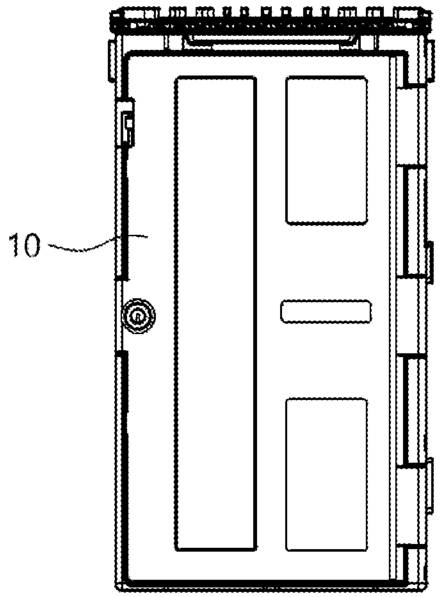
[FIG.2B]
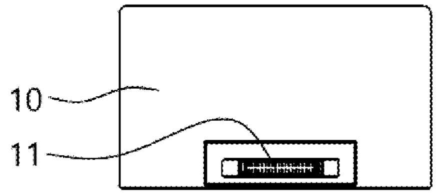

[FIG.2C]
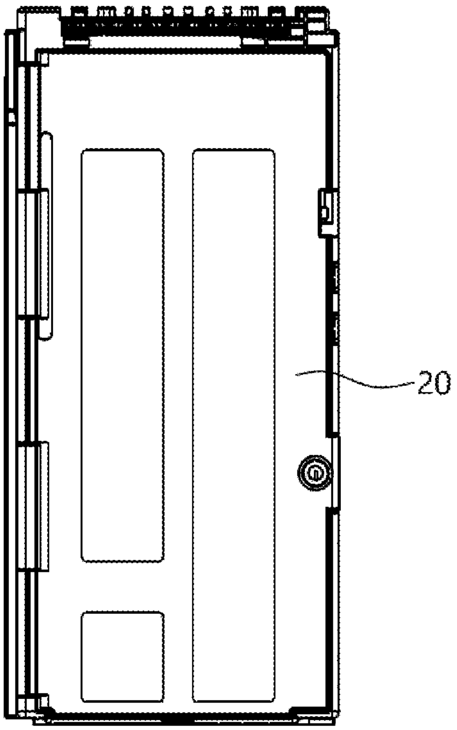
[FIG.2D]

[FIG.3]
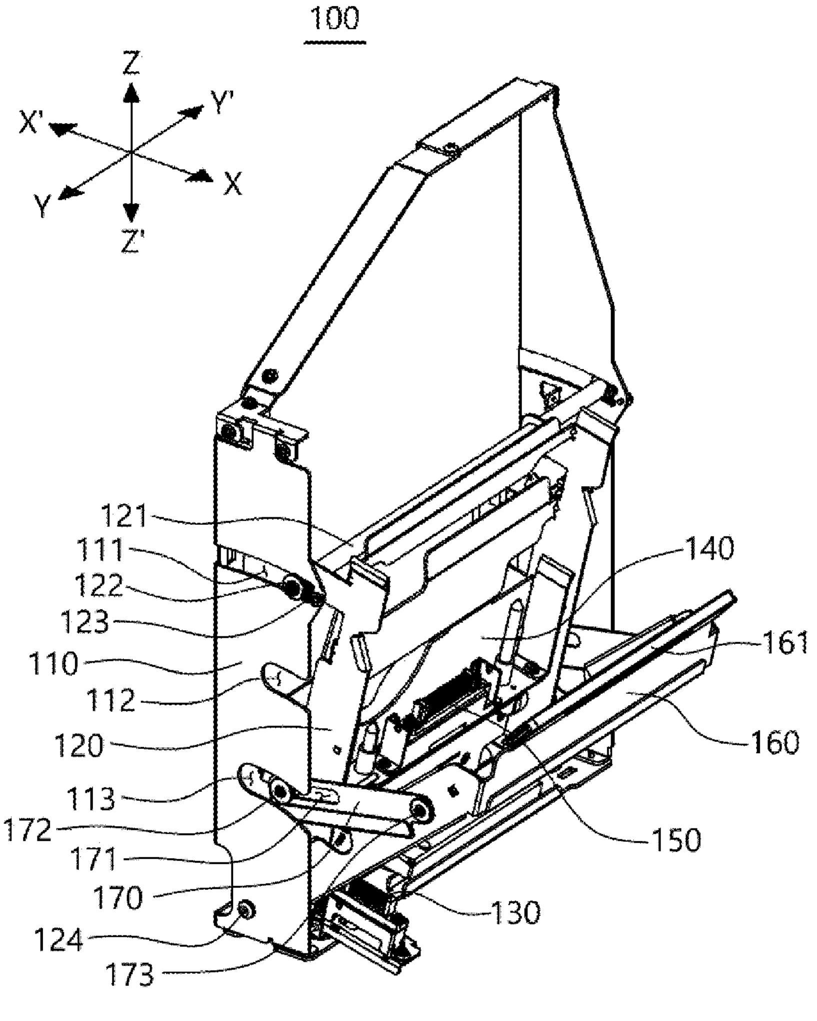

[FIG.4]
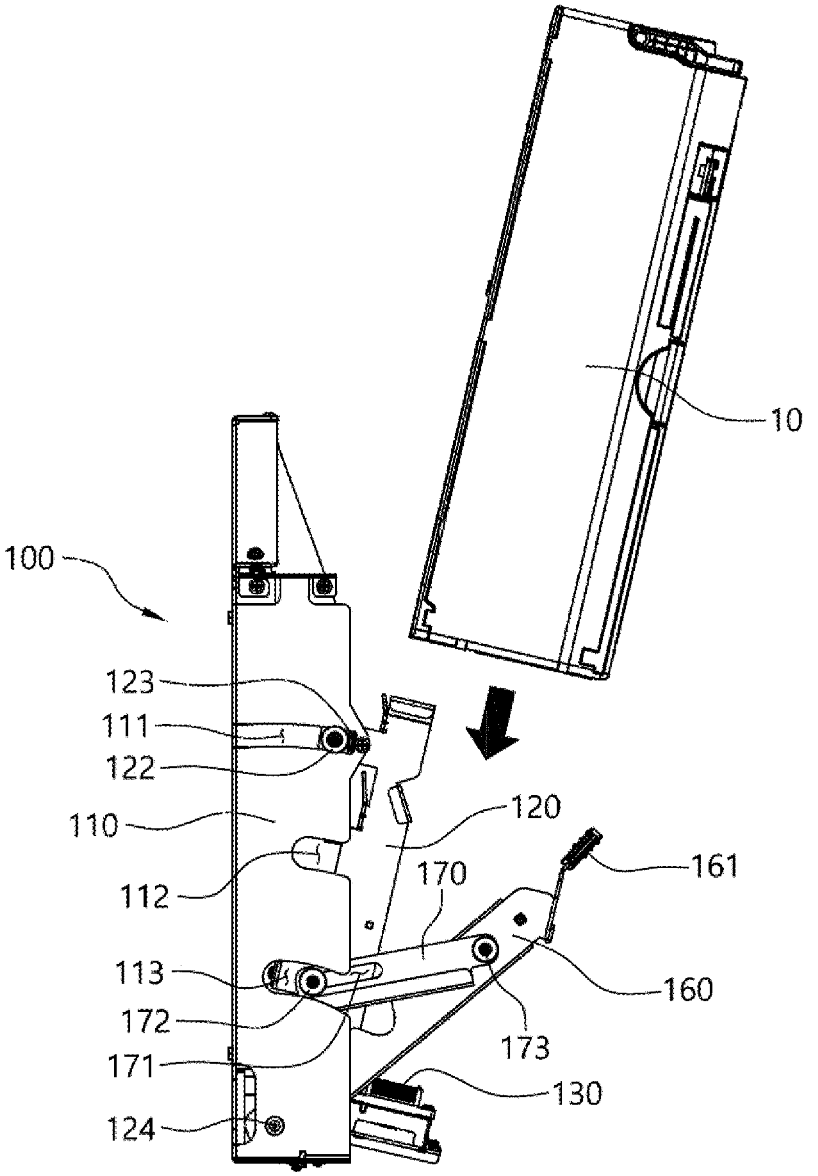

[FIG.5]
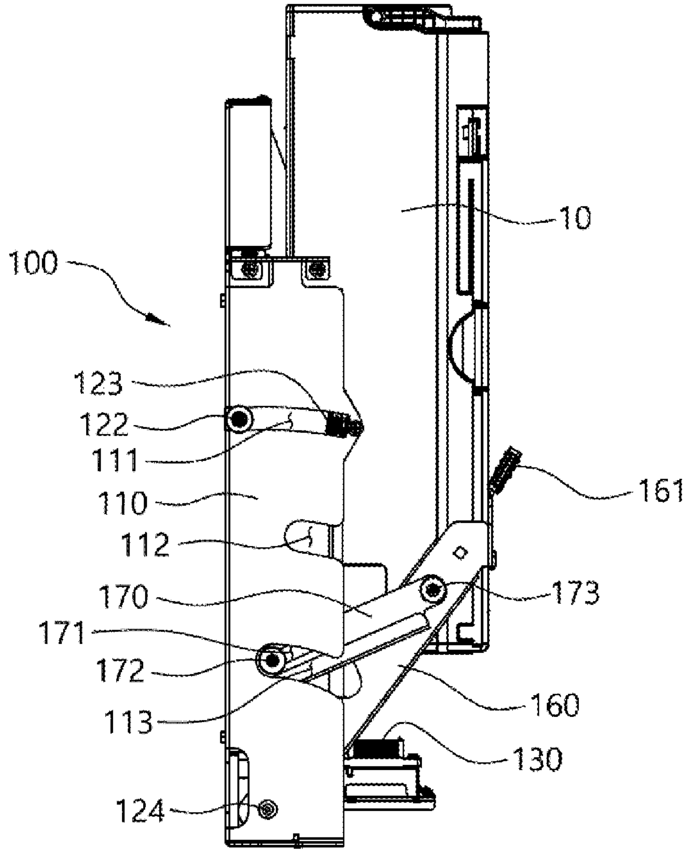

[FIG.6]
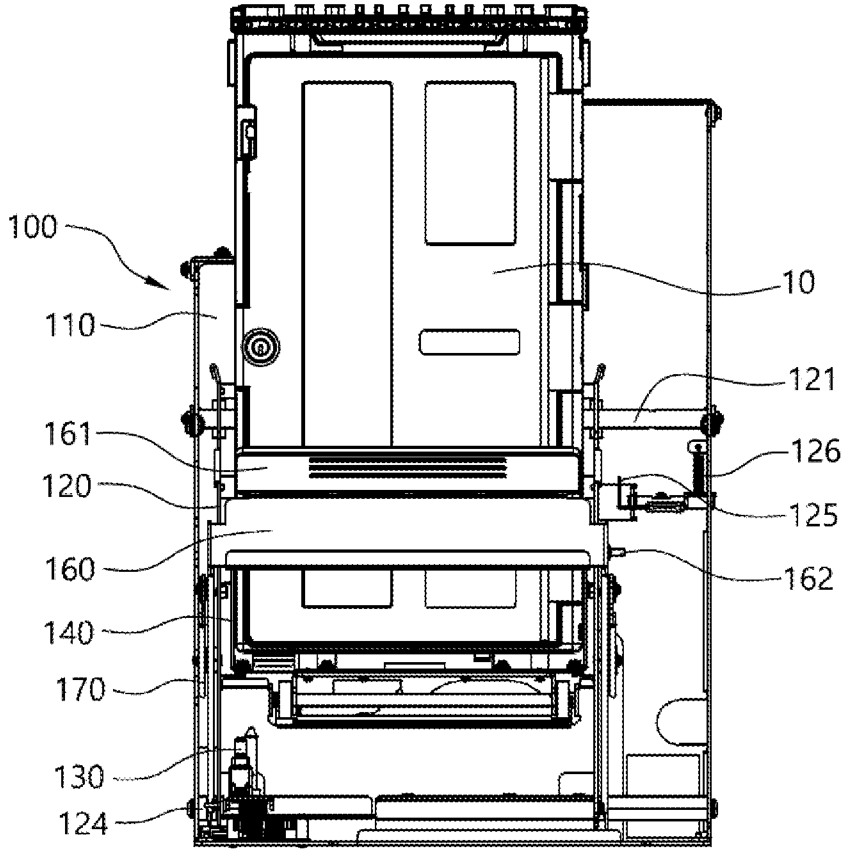

[FIG.7]
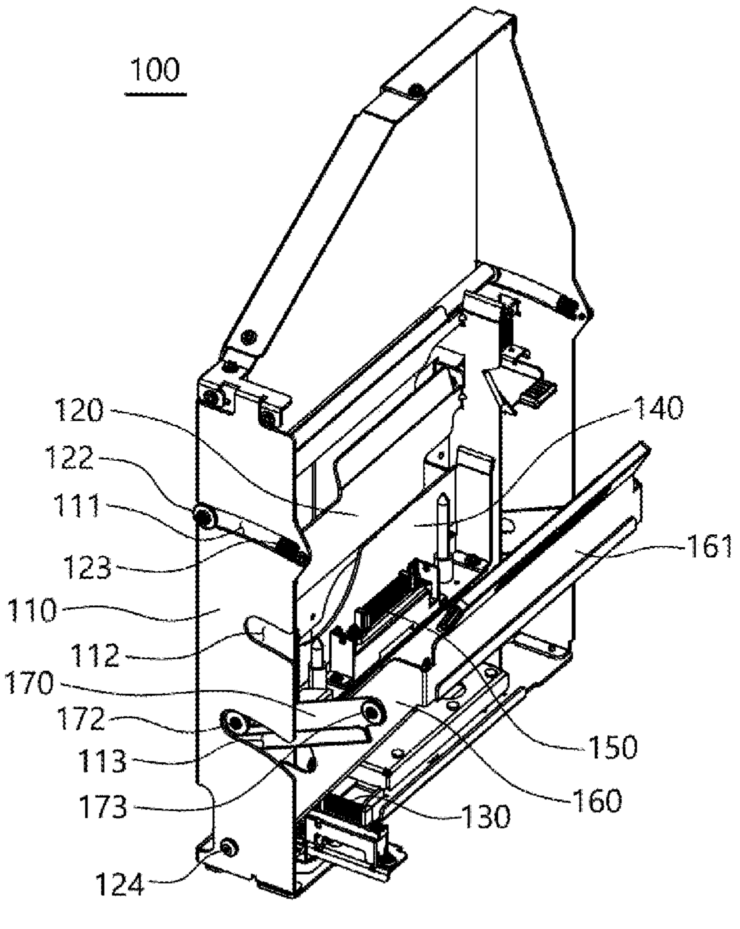

[FIG.8]
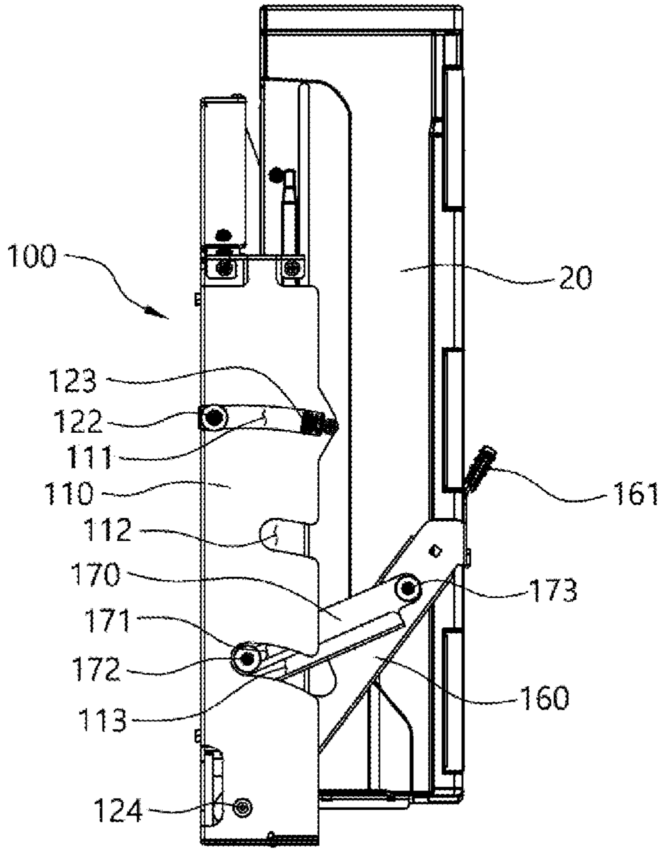

[FIG.9]
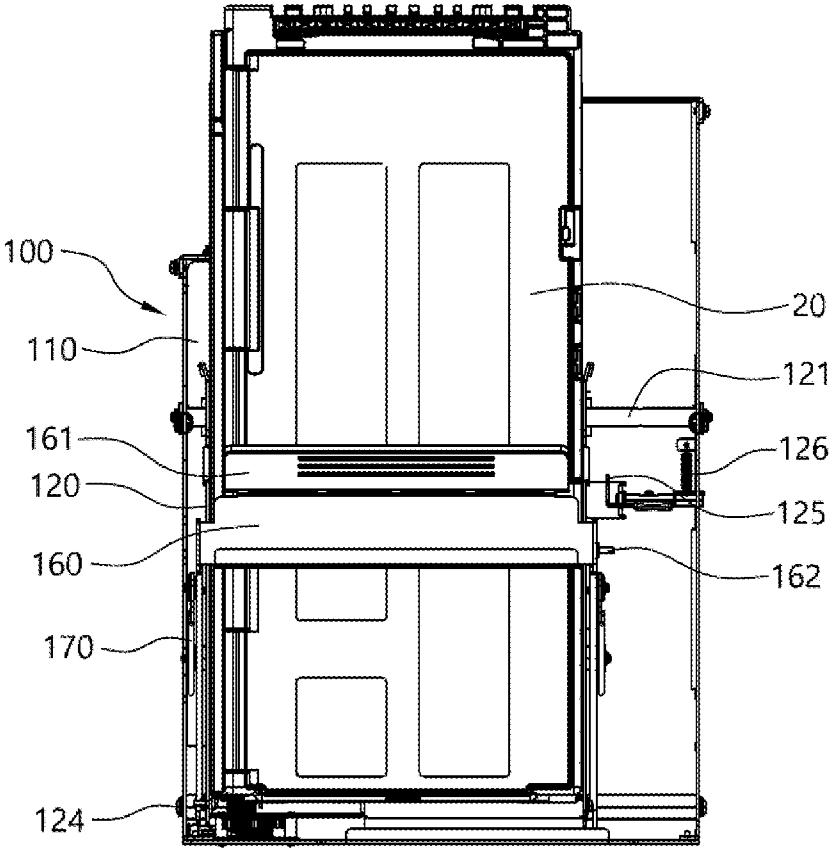

[FIG.10]
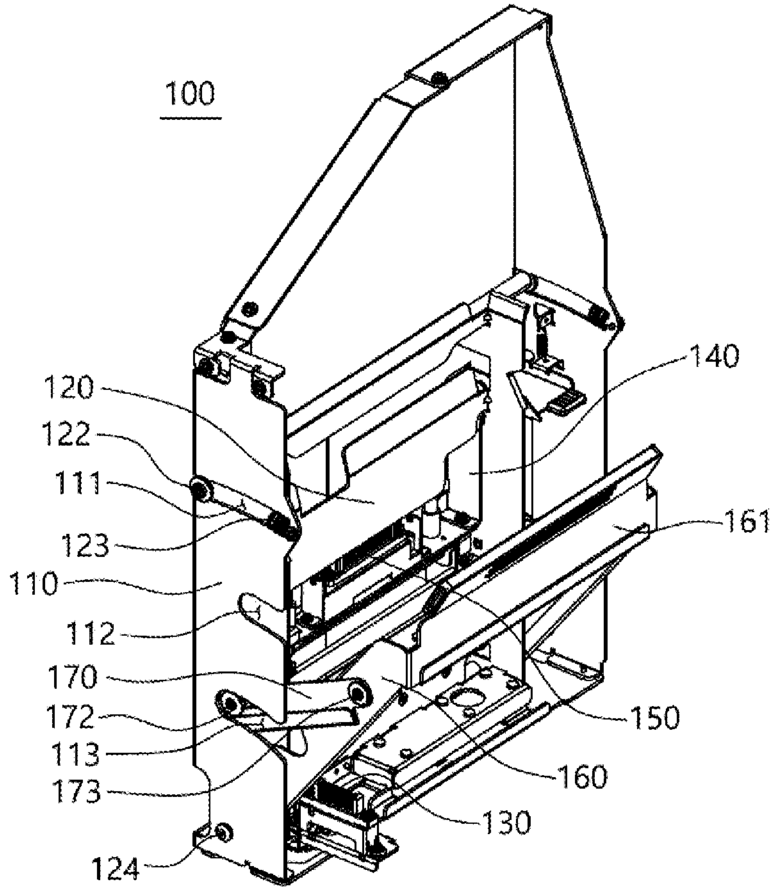

[FIG.11]
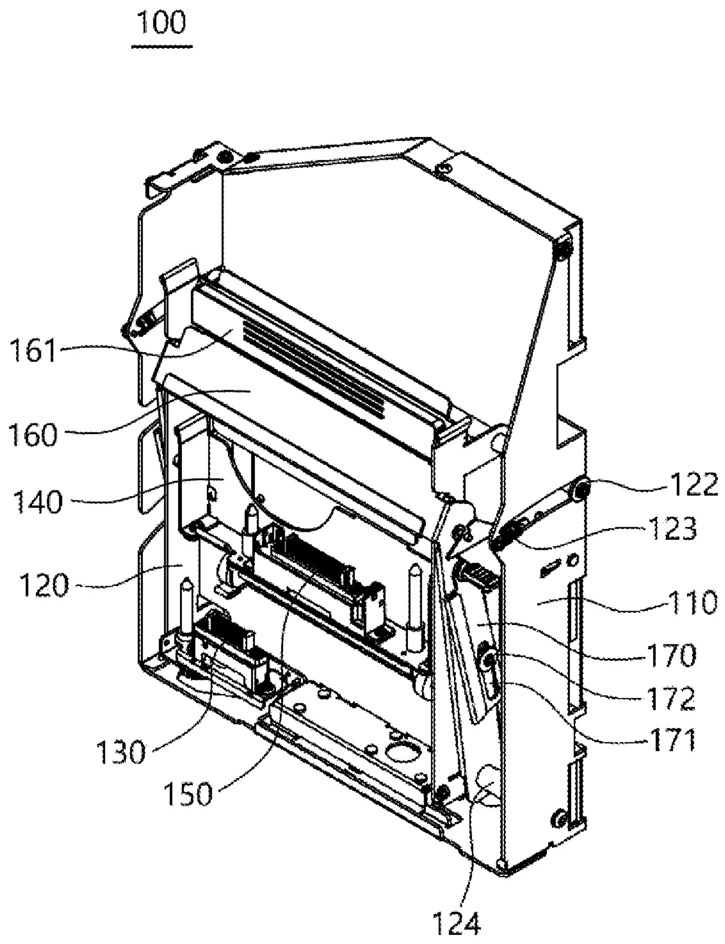

[FIG.12]
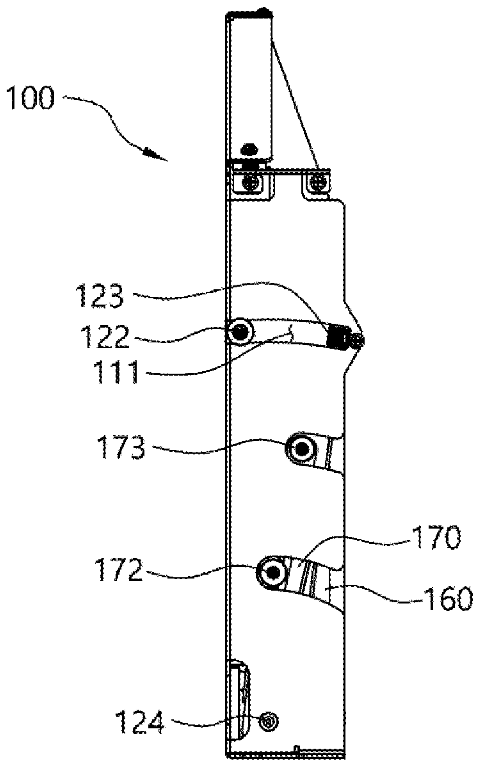
[FIG.13]
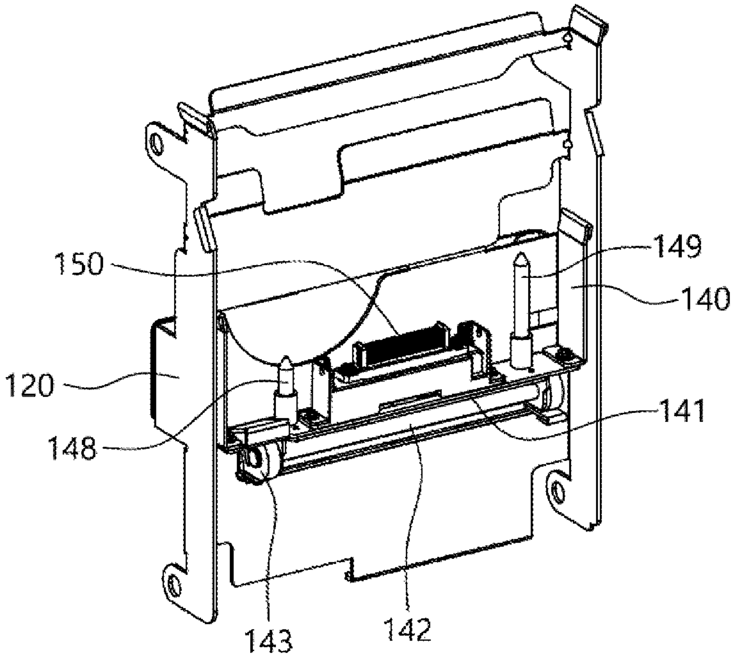

[FIG.14]
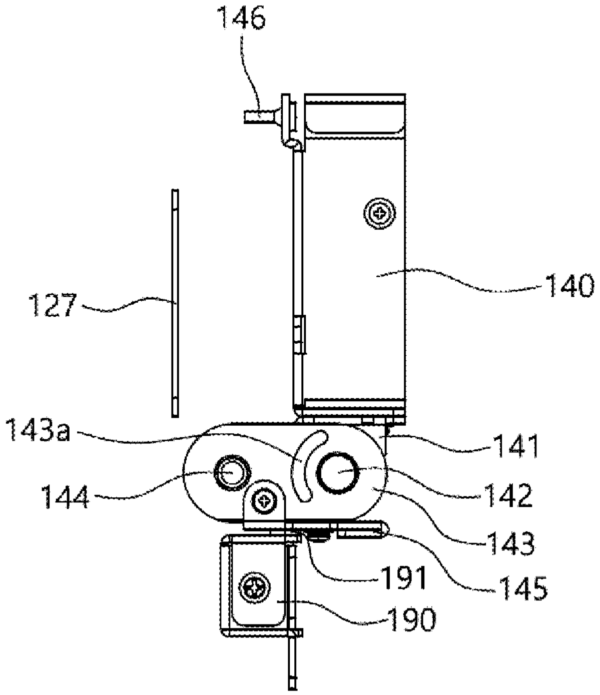
[FIG.15]
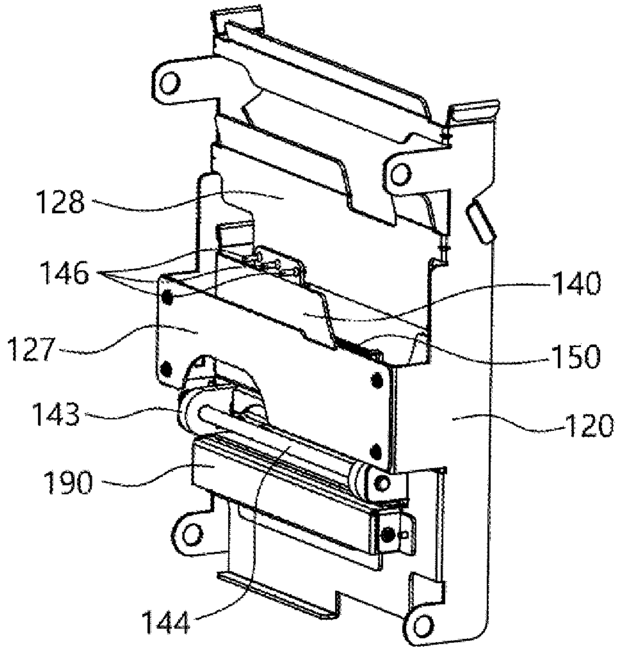

[FIG.16]
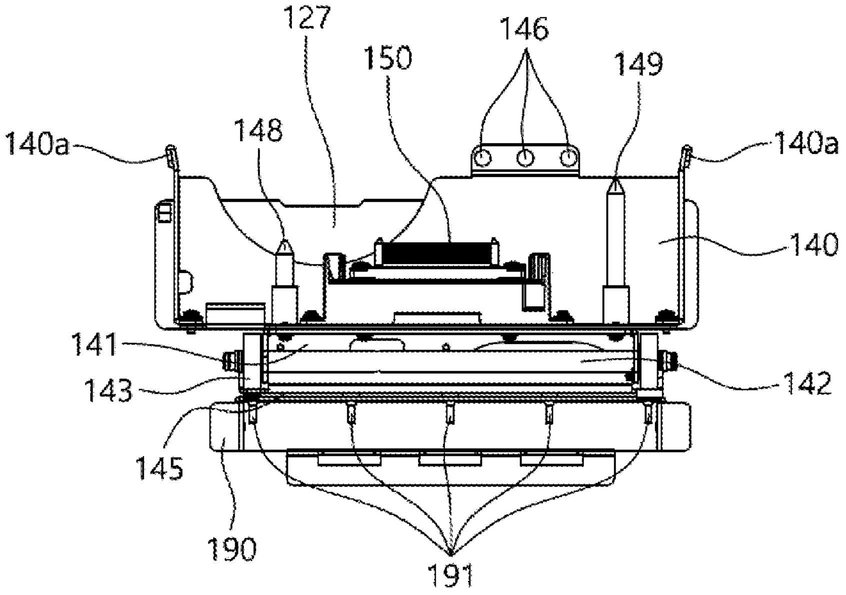
[FIG.17]
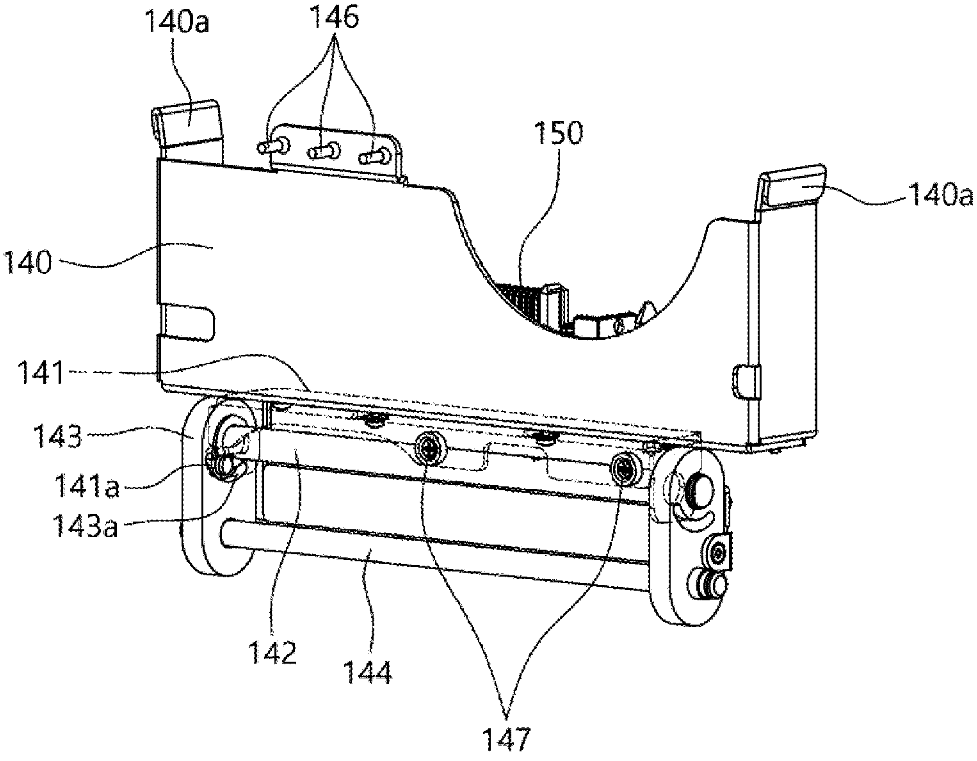

[FIG.18]
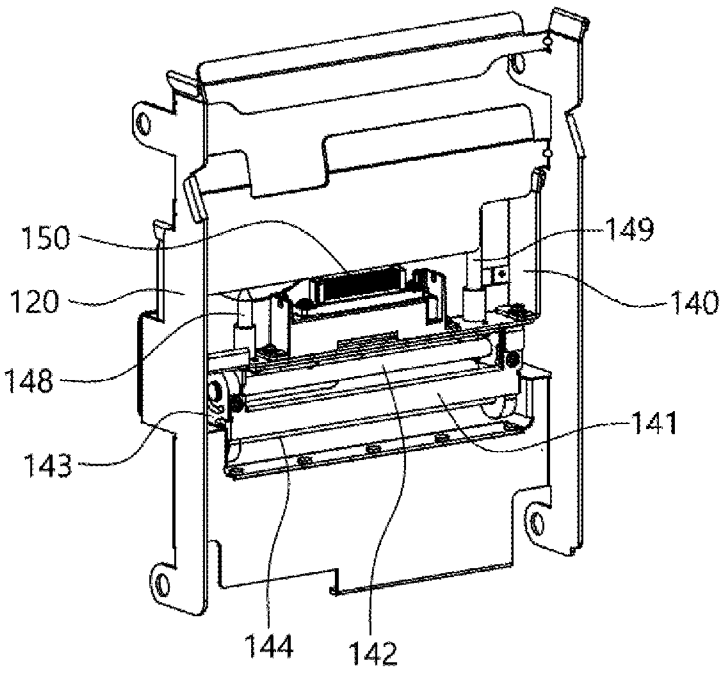
[FIG.19]
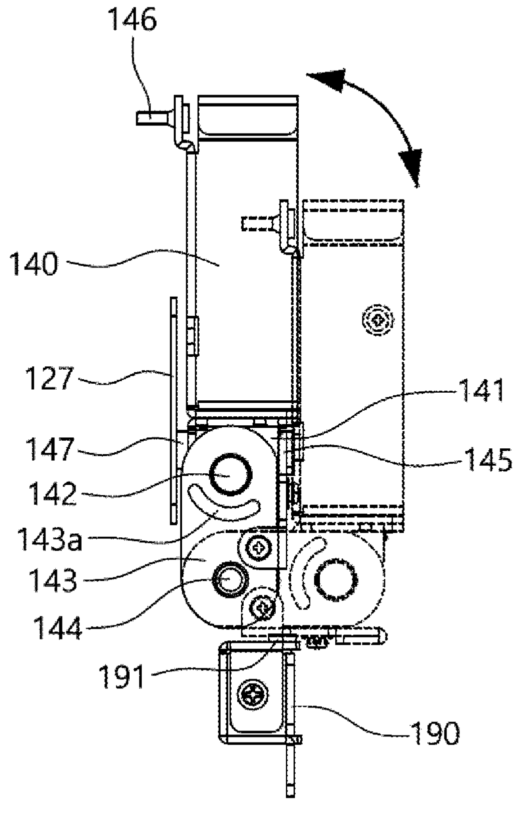

[FIG.20]
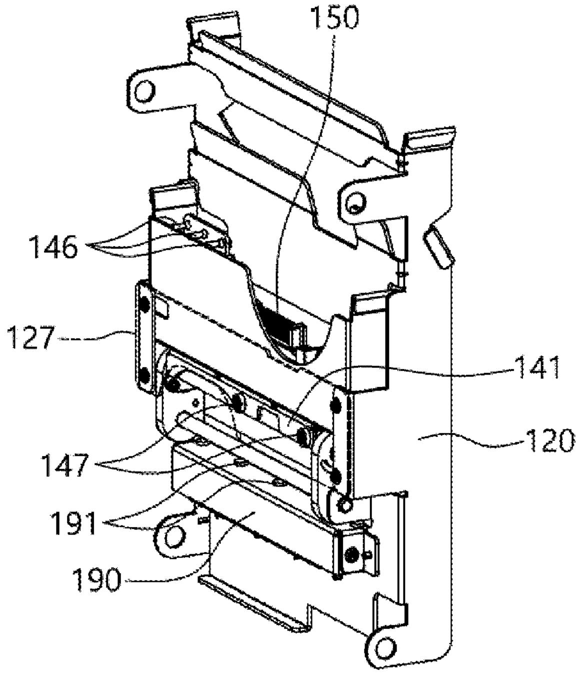
[FIG.21]
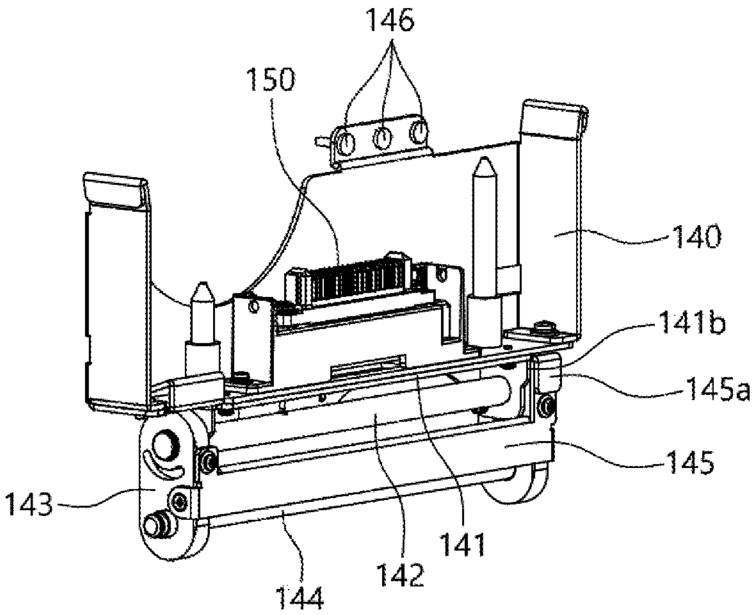

[FIG.22]
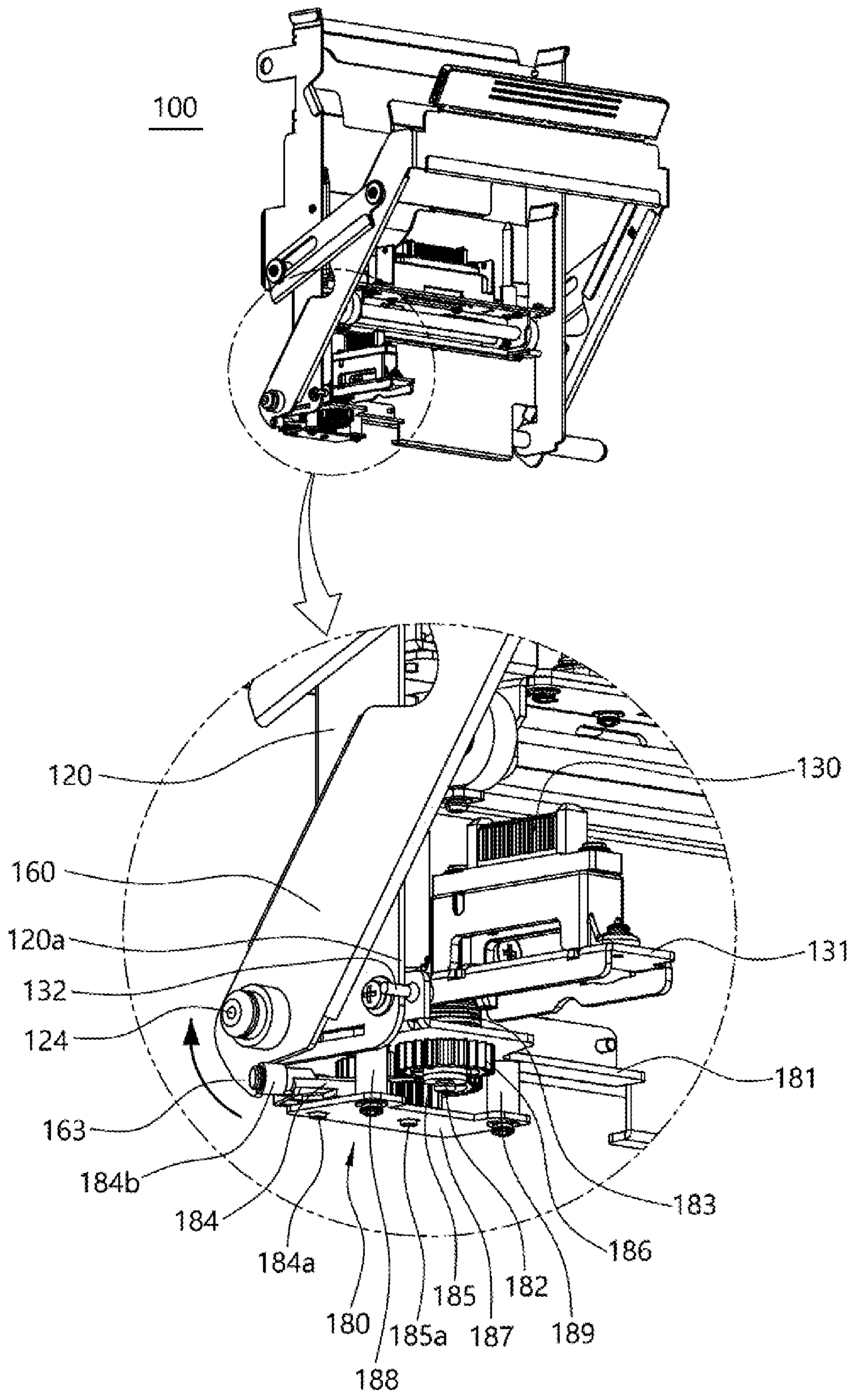

[FIG.23]
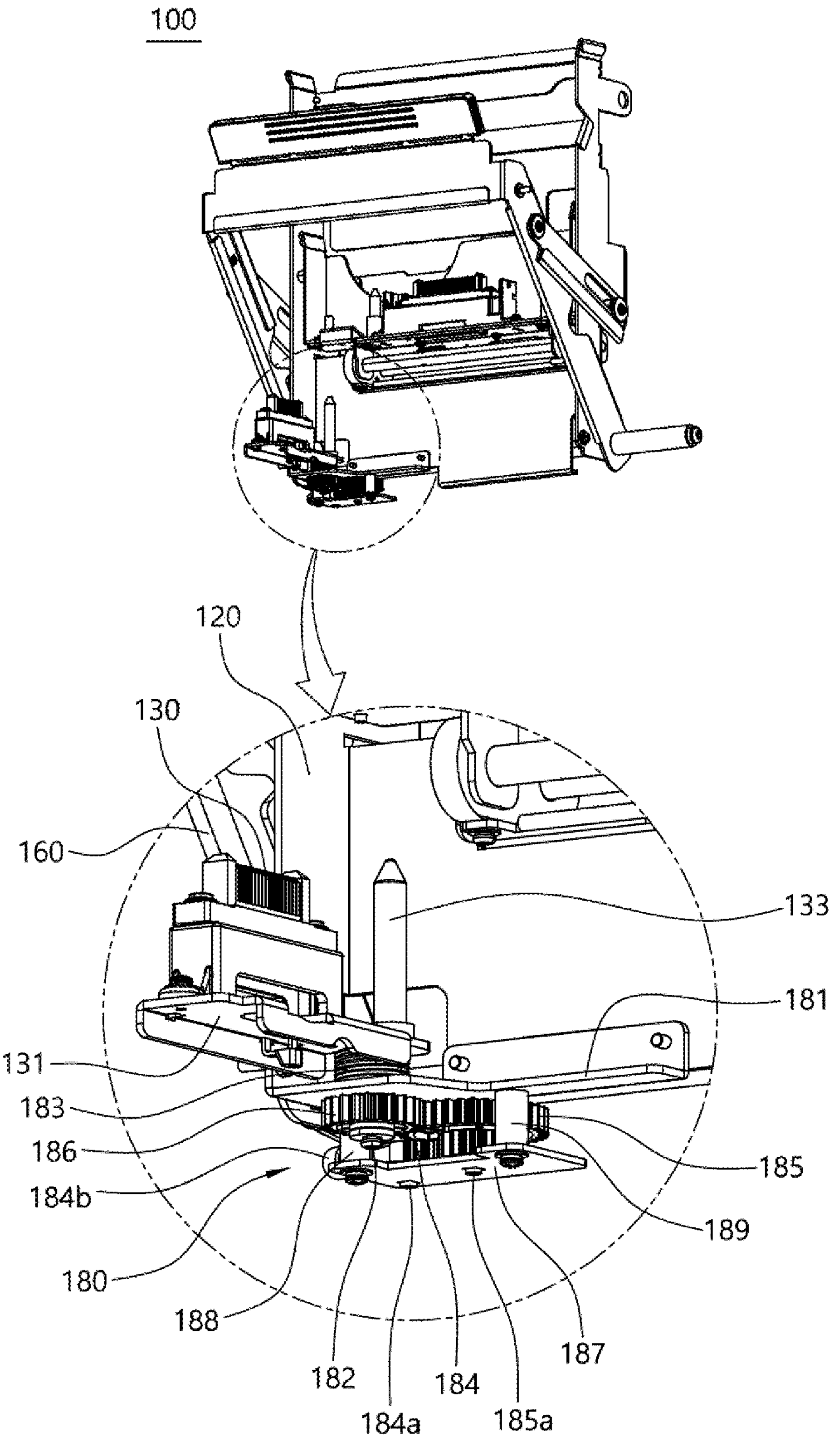

[FIG.24]
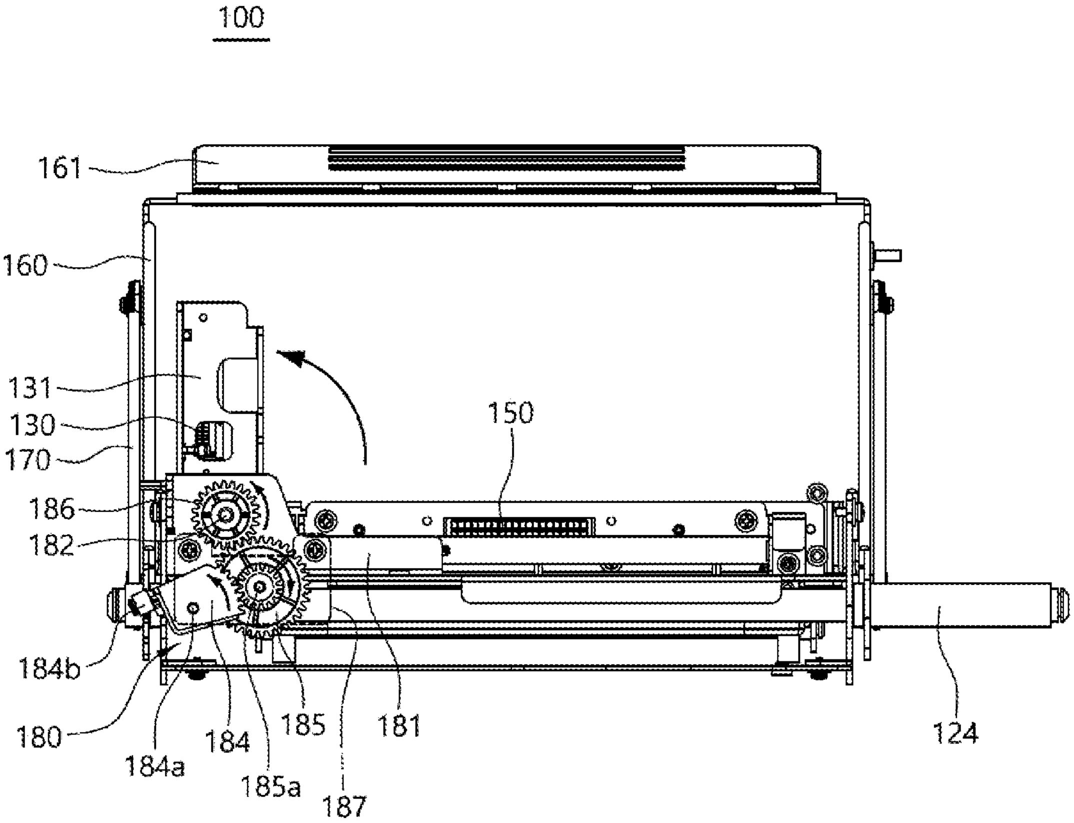

[FIG.25]
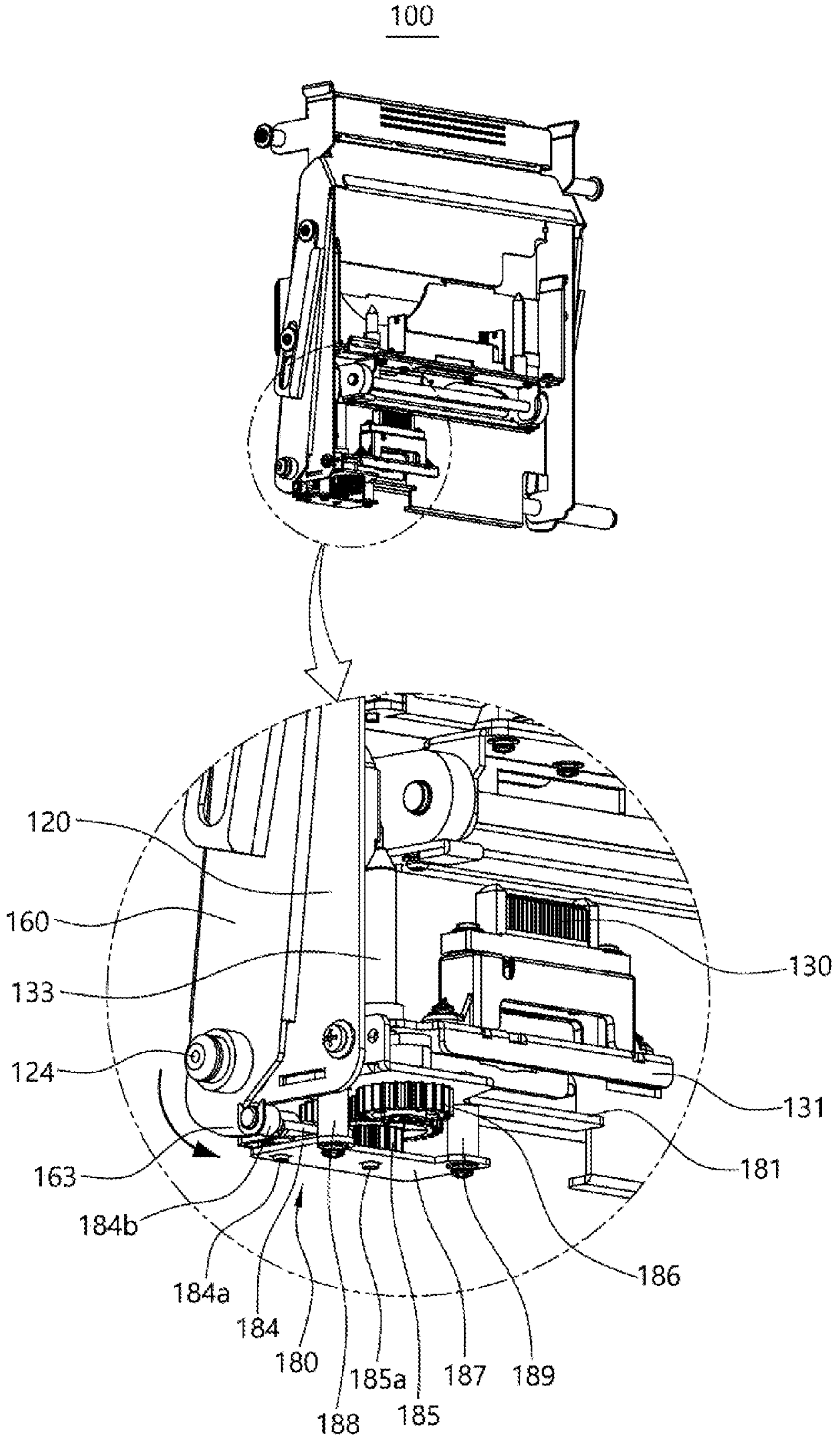

[FIG.26]
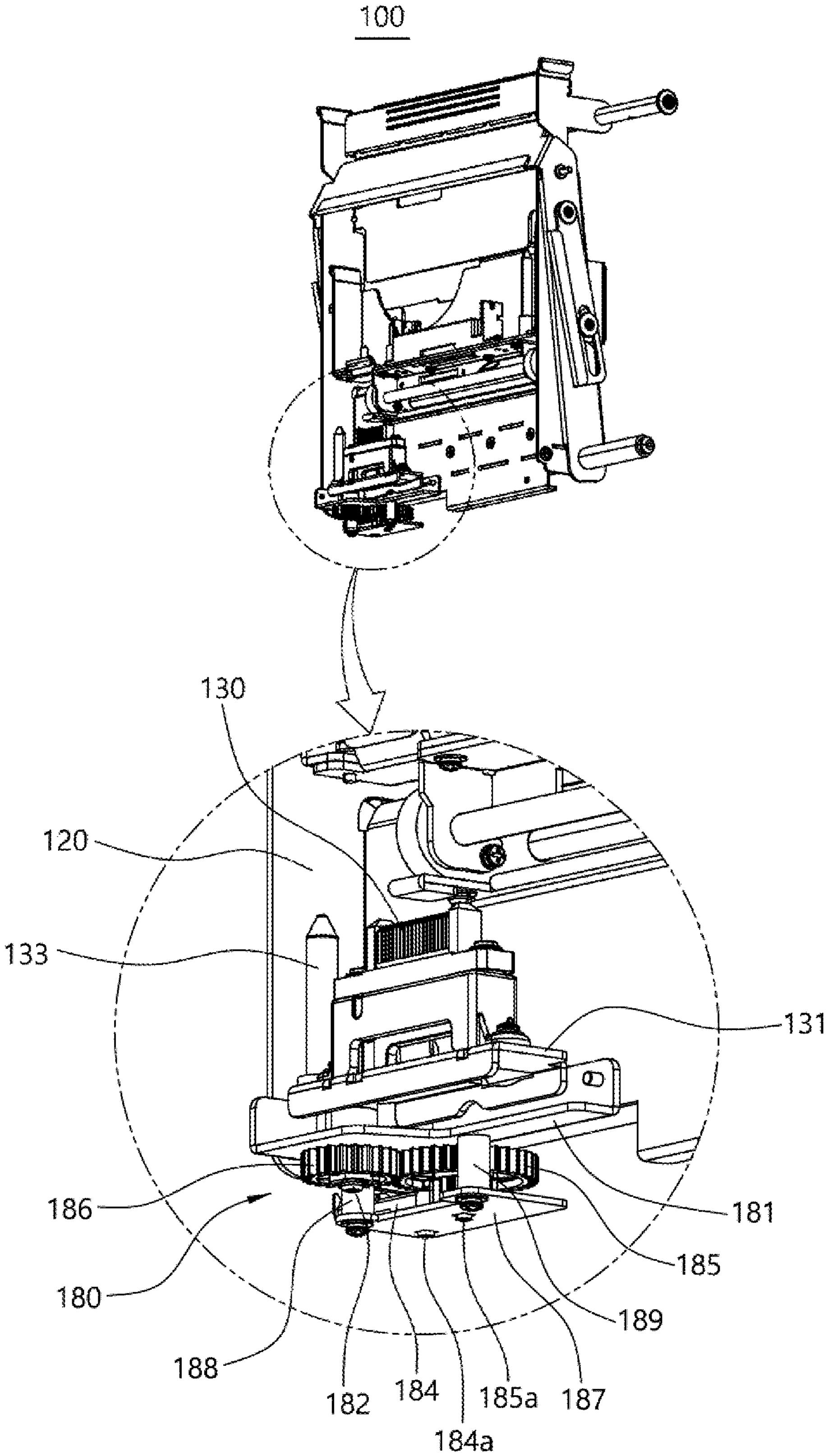

[FIG.27]
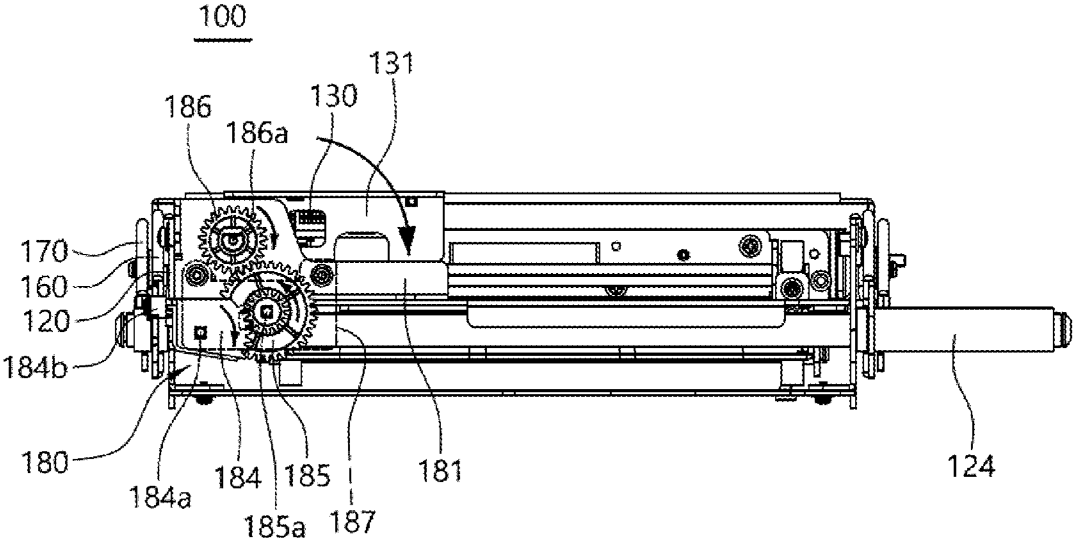

CASSETTE HOLDER FOR AUTOMATED TELLER MACHINE

BACKGROUND

1. Field of the Invention

The present invention relates to a cassette holder for an automated teller machine, and more specifically, to a cassette holder for an automated teller machine that can hold cassettes of different sizes using one holder in common.

2. Discussion of Related Art

Automated teller machines are devices that enable users to perform deposit and withdrawal transactions such as with cash or checks, account transfers, inquiries, and the like without time constraints using cash cards, bankbooks, or the like issued by financial institutions, and are widely used in the financial industry because they rapidly process users' financial affairs.

In such an automated teller machine, a banknote storage unit including a plurality of cassettes in which banknotes are stored is provided, and replenishment/collection cassettes are used for replenishing the cassettes with banknotes or for collecting banknotes from the cassettes. A cassette holder may be provided at one side of the banknote storage unit of the automated teller machine to support and hold replenishment/collection cassettes when a transit function for replenishment or collection of banknotes is performed.

Since the replenishment/collection cassettes have different lengths in a lateral direction and heights in a vertical direction according to their specifications and positions and directions (horizontal direction or vertical direction) in which connectors for transmitting power applied to the cassettes and control signals are disposed on the cassettes are different, holders that meet the specifications of the cassettes are conventionally provided and used for each cassette, and there is a structural limitation that one holder cannot be used interchangeably with different cassettes.

Related art related to a holder for an automated financial machine is disclosed in Korean Registered Patent No. 10-1628206.

SUMMARY OF THE INVENTION

The present invention is directed to providing a cassette holder for an automated teller machine having a structure that can hold cassettes of different sizes using one holder and that is applicable to connectors disposed in different positions and directions to be compatible therewith.

According to an aspect of the present invention, there is provided a cassette holder for an automated teller machine, comprising: a first holding part configured to hold a first cassette having a predetermined volume; and a second holding part in which the first holding part is connected to an inner side thereof and which is configured to hold a second cassette having a larger volume than the first cassette, wherein the first holding part is moved in a front-rear direction between a first position in which the first holding part is positioned at a front side of the second holding part to hold the first cassette on the first holding part and a second position in which the first holding part is positioned at a rear side of the second holding part to hold the second cassette on the second holding part.

The cassette holder, further comprising: a frame configured to support the first holding part and the second holding part; a support member which supports a front surface of the first cassette or the second cassette and is rotatable in a front-rear direction around a support shaft connected in a lateral direction to a lower portion of the frame; and a link member having both ends which are rotatably connected to the second holding part and the support member so that an angle between the second holding part and the support member is adjusted.

The cassette holder, wherein the first cassette is inserted between the first holding part and the support member and the first holding part supports a rear surface, both side surfaces, a bottom surface of the first cassette, and the second cassette is inserted between the second holding part and the support member and the second holding part supports a rear surface, both side surfaces, a bottom surface of the second cassette.

The cassette holder of, wherein a lower portion of the second holding part is provided so as to be rotatable in a front-rear direction around the support shaft and a moving shaft is coupled to an upper portion of the second holding part in a lateral direction, and both ends of the moving shaft are provided to be movable within a predetermined angle range in the front-rear direction within guide holes formed in both side surfaces of an upper portion of the frame in the front-rear direction.

The cassette holder, wherein a first connector connection unit connected to a first connector provided on a bottom surface of the first cassette is provided in the first holding part, and the first connector connection unit is provided to maintain an upright state when the first holding part is positioned in the first position and the second position.

The cassette holder, wherein the first holding part is provided to be rotatable in the front-rear direction between the first position and the second position around a rotation shaft connected to both side surfaces of the second holding part.

The cassette holder, wherein one side portion of a rotating member is connected to the rotation shaft, a first support plate is coupled to a bottom surface of the first holding part, and a connecting shaft that passes through the first support plate and is provided in the lateral direction is connected to another side portion of the rotating member so as to be relatively rotatable.

The cassette holder, wherein a first fixing member that fixes and supports the first holding part in a state in which the first holding part is rotated to the first position is provided, and the first fixing member includes a stopper member which is provided on an upper end portion of the first holding part and engaged to a front side plate of the second holding part in the state in which the first holding part is rotated to the first position.

The cassette holder, wherein a second support plate is coupled to one side surface of the rotating member, and the cassette holder further includes a buffer member configured to absorb an impact caused by a collision with the second support plate when the first holding part is rotated to the first position.

The cassette holder, wherein a second fixing member that fixes and supports the first holding part in a state in which the first holding part is rotated to the second position is provided, and the second fixing member includes a magnetic substance which is mounted on a rear surface of the first support plate and attached to a rear side plate of the second holding part in the state in which the first holding part is rotated to the second position.

The cassette holder, wherein a second support plate is coupled to one side surface of the rotating member, and when the first holding part is rotated to the second position, an engaging piece formed on one side portion of the second support plate is engaged to a coupling part formed on one side portion of the first support plate.

The cassette holder, wherein an arc-shaped guide groove along the rotational direction of the rotating member is formed in one side surface of the rotating member, and a guide pin positioned to protrude toward an inner side of the guide groove is provided on the first support plate.

The cassette holder, wherein a first connector connection unit connected to a first connector provided on a bottom surface of the first cassette to have a length in one direction is provided in the first holding part, and a second connector connection unit connected to a second connector provided on a bottom surface of the second cassette to have a length in a direction different from that of the first connector is provided in the second holding part.

The cassette holder, wherein the second connector connection unit is provided so as to be rotatable in both directions around a rotation shaft between a third position in which the second connector connection unit is positioned in a front of the second holding part and a fourth position in which the second connector connection unit is positioned in an inner side of the second holding part in conjunction with the rotation of the support member in the front-rear direction.

The cassette holder, wherein, when the support member is rotated forward, the second connector connection unit is rotated toward the front of the second holding part due to action of an elastic force of an elastic member so that the second connector connection unit corresponds vertically to the second connector of the second cassette and is positioned to be connectable, and when the support member is rotated backward, the second connector connection unit is rotated and positioned toward an inner side of the second holding part by power transmission due to a plurality of gears interlocking with the support member.

According to another aspect of the present invention, there is provided a cassette holder for an automated teller machine, comprising: a first holding part configured to hold a first cassette; and a second holding part configured to hold a second cassette having a volume different from that of the first cassette, wherein at least one holding part of the first holding part and the second holding part is configured to be movable to a position where the at least one holding part does not interfere with the cassette held on the other holding part.

According to another aspect of the present invention, there is provided a cassette holder for an automated teller machine, comprising: a first holding part configured to hold a first cassette having a first connector; and a second holding part configured to hold a second cassette in which a second connector disposed in a position and direction different from those of the first connector is provided and having a volume different from that of the first cassette, wherein a first connector connection unit connected to the first connector is provided in the first holding part and a second connector connection unit connected to the second connector is provided in the second holding part, and at least one holding part of the first holding part and the second holding part is configured to be movable to a position where the at least one holding part does not interfere with the cassette held on the other holding part.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a view illustrating a state in which a cassette holder is used when banknotes are replenished or collected through a cassette in an automated teller machine according to an embodiment of the present invention;

FIG. 2A is a front view of a first cassette that can be held on the cassette holder of the automated teller machine according to the present invention, FIG. 2B is a bottom view of the first cassette, FIG. 2C is a front view of a second cassette, and FIG. 2D is a bottom view of the second cassette;

FIG. 3 is a perspective view illustrating a state in which the cassette holder for the automated teller machine according to the present invention is fully unfolded forward;

FIG. 4 is a side view illustrating a state before the cassette is held on the cassette holder for the automated teller machine according to the present invention in the state of FIG. 3;

FIG. 5 is a side view illustrating a state in which a relatively small first cassette is held on the cassette holder for the automated teller machine according to the present invention;

FIG. 6 is a front view of FIG. 5;

FIG. 7 is a perspective view illustrating a state in which a first holding part is rotated forward and positioned when the first cassette is held on the cassette holder for the automated teller machine according to the present invention;

FIG. 8 is a side view illustrating a state in which a relatively large second cassette is held on the cassette holder for the automated teller machine according to the present invention;

FIG. 9 is a front view of FIG. 8;

FIG. 10 is a perspective view illustrating a state in which the first holding part is rotated backward and avoided when the second cassette is held on the cassette holder for the automated teller machine according to the present invention;

FIG. 11 is a perspective view illustrating a state in which a support member is folded toward an inner side of a frame in the cassette holder for the automated teller machine according to the present invention;

FIG. 12 is a side view of FIG. 11;

FIG. 13 is a perspective view of main parts in the state in which the first holding part is rotated forward and positioned when the first cassette is held on the cassette holder for the automated teller machine according to the present invention;

FIG. 14 is a side view of a state in which the first holding part is rotated forward and positioned in the state of FIG. 13;

FIG. 15 is a rear side perspective view of FIG. 13, and illustrates a state in which a stopper member installed in the first holding part is engaged to a front side plate of a second holding part and supported at a first position at which the first holding part is rotated forward;

FIG. 16 is a front view illustrating a state in which a rotating member and a first support plate that support a lower portion of the first holding part are rotated forward, mounted on a buffer member of a second support plate, and supported at the first position at which the first holding part is rotated forward in the state of FIG. 13;

FIG. 17 is a view illustrating an operation in which the first holding part maintains an upright state and is rotated in conjunction with the rotation of the rotating member;

FIG. 18 is a perspective view of main parts in the state in which the first holding part is rotated backward and avoided when the second cassette is held on the cassette holder for the automated teller machine according to the present invention;

FIG. 19 is a side view of an operating state in which the first holding part is rotated from the front to the rear in the state of FIG. 18;

FIG. 20 is a rear side perspective view of FIG. 18, and illustrates a state in which a magnetic substance installed in the first support plate is attached to a rear side plate of the second holding part and supported at a second position at which the first holding part is rotated backward;

FIG. 21 is a view illustrating a state in which an engaging piece formed on the second support plate is engaged to a coupling part formed on the first support plate and supported at the second position at which the first holding part is rotated backward in the state of FIG. 15;

FIGS. 22 and 23 are perspective views illustrating states in which a second connector connection unit is rotated forward in conjunction with the support member when the support member is rotated forward, from different directions;

FIG. 24 is a bottom view for describing an operation of a power transmission unit in the states of FIGS. 22 and 23;

FIGS. 25 and 26 are perspective views illustrating states in which a second connector connection unit is rotated backward in conjunction with the support member when the support member is rotated backward, from different directions; and FIG. 27 is a bottom view for describing an operation of the power transmission unit in the states of FIGS. 25 and 26.

DETAILED DESCRIPTION OF EXEMPLARY EMBODIMENTS

Hereinafter, a configuration and operation of an exemplary embodiment of the present invention will be described in detail with reference to the accompanying drawings.

Referring to FIG. 1, an automated teller machine 1 according to an embodiment of the present invention includes a cassette holder 100, a deposit and withdrawal unit 200, a discrimination unit 300, a temporary storage unit 400, a banknote storage unit 500, a transfer path 600, a door 700, a cover 800, and a replenishment entrance 900.

The cassette holder 100 may be provided below the replenishment entrance 900, be provided on an outer side of the door 700 that opens or closes the banknote storage unit 500, and be opened or closed by the cover 800. In a state in which the cover 800 is opened, replenishment cassettes 10 and 20 that can replenish or collection banknotes may be mounted in the cassette holder 100.

The deposit and withdrawal unit 200 provides a deposit and withdrawal space for inserting or receiving banknotes.

The discrimination unit 300 discriminates the type and abnormality of banknote passing through the transfer path 600. When counting a deposit of banknotes, normal banknotes, which have been discriminated as normal banknotes by the discrimination unit 300, may be temporarily stored in the temporary storage unit 400, and the banknotes discriminated as defective banknotes by the discrimination unit 300 may be transferred through the deposit and withdrawal unit 200 to be returned to the customer.

The temporary storage unit 400 provides a storage space in which the banknotes discriminated by the discrimination unit 300 may be temporarily stored.

The banknote storage unit 500 provides a space in which banknotes are stored, and may include a plurality of cassettes 510 having different sizes according to their types.

The transfer path 600 may provide a movement path for banknotes to be deposited and withdrawn through the deposit and withdrawal unit 300 and a movement path for banknotes to replenish/collect the banknotes.

The door 700 is a component for opening or closing one side surface of the banknote storage unit 500, and the cassette holder 100 may be provided on an outer side surface of the door 700.

The cover 800 may be opened so that the cassette holder 100 is exposed to the outside when the cassette holder 100 is used for replenishment/collection of banknotes, and may be closed so that the cassette holder 100 is not exposed to the outside when the cassette holder 100 is not in use.

A connection transfer path 601 connected to the replenishment cassettes 10 and 20 when the banknotes are replenished or collected is provided in the replenishment entrance 900, and the connection transfer path 601 is connected to the cassettes 510 of the banknote storage unit 500 through the transfer path 600.

The configuration of the automated teller machine 1 is only an example to aid understanding of the present embodiment, and may be replaced or modified with another configuration as necessary.

Hereinafter, a configuration and operation of a cassette holder 100 for an automated teller machine according to an embodiment of the present invention will be described.

FIG. 2 illustrates replenishment cassettes 10 and 20 applied to the present invention, and a first cassette 10 having a predetermined volume and a second cassette 20 having a larger volume than the first cassette 10 are illustrated. Referring to FIGS. 2A and 2C, the first cassette 10 is configured to have a smaller width and a smaller height than the second cassette 20, and the second cassette 20 is configured to have a greater width and a greater height than the first cassette 10.

Further, referring to FIGS. 2B and 2D, a first connector 11 provided on a bottom surface of the first cassette 10 and a second connector 21 provided on a bottom surface of the second cassette 10 are installed in different positions and may be disposed so that their longitudinal directions are different from each other.

In an embodiment, based on the directions illustrated in FIGS. 2B and 2D, the first connector 11 may be disposed on a lower middle portion of the bottom surface of the first cassette 10 to have a length in a horizontal direction, and the second connector 21 may be disposed on a left middle portion of the bottom surface of the second cassette 20 to have a length in a vertical direction.

In the present embodiment, the cassette holder 100 for the automated teller machine that can hold the first cassette 10 and the second cassette 20 having different sizes, as described above and that is applicable to the first connector 11 and the second connector 21 disposed in different positions and directions to be compatible therewith is provided.

Hereinafter, in referring to directions in this specification, an X-X' direction illustrated in FIG. 3 is referred to as a front-rear direction, a Y-Y' direction is referred to as a left-right direction (or a lateral direction), a Z-Z' direction is referred to as an up-down direction, a X direction is referred to as a forward direction, and a X' direction is referred to as a backward direction.

FIGS. 3 and 4 illustrate states before the replenishment cassettes 10 and 20 are held on the cassette holder 100 of the present embodiment, and illustrate states in which the cassette holder 100 is fully unfolded forward so that a storage space in which the replenishment cassettes 10 and 20 can be mounted is secured.

The cassette holder 100 for the automated teller machine of the present invention includes a first holding part 140 for holding the first cassette 10 having a predetermined volume, and a second holding part 120 having an inside to which the first holding part 140 is connected and for holding the second cassette 20 having a larger volume than the first cassette 10.

The cassette holder 100 includes a frame 110 that supports the first holding part 140 and the second holding part 120, a support member 160 that supports a front surface of the first cassette 10 or the second cassette 20 and is rotatable in a front-rear direction around a support shaft 124 connected in a lateral direction to a lower portion of the frame 110, and a link member 170 having both ends rotatably connected to the second holding part 120 and the support member 160 so that an angle between the second holding part 120 and the support member 160 is adjusted.

The frame 110 may include a rear surface which is coupled to the above-described door 700 and formed in a closed shape, a front surface which is formed in an open structure so that the support member 160 and the second holding part 120 are rotatable in the front-rear direction, and both side surfaces which each extend a predetermined length forward from both side ends of the rear surface of the frame 110.

Guide holes 111 having a long hole shape having a predetermined length in the front-rear direction are formed in upper portions of both side surfaces of the frame 110, and both side ends of a moving shaft 121 coupled in the lateral direction to an upper portion of the second holding part 120 are positioned on inner sides of the guide holes 111.

First coupling members 122 for preventing separation of the moving shaft 121 are coupled to the both side ends of the moving shaft 121 passing through the guide holes 111. A buffer spring 123 for absorbing an impact between the first coupling member 122 and the guide hole 111 caused when the second holding part 120 is rotated forward may be provided in the front of the guide hole 111.

In middle portions in the vertical direction of both side surfaces of the frame 110, a first slot part 112 and a second slot part 113 for preventing interference during movement of third coupling members 173 and second coupling members 172 that are coupled to both ends of the link member 170 are formed at positions spaced apart from each other vertically.

Both side ends of the support shaft 124 provided in the lateral direction are coupled to the both side surfaces of the frame 110. The support shaft 124 serves as a rotation center around which the second holding part 120 and the support member 160 are rotated.

The second holding part 120 is a component for holding the second cassette 20 having a relatively large volume, and a width between both side surfaces in the left-right direction thereof is formed to have a size corresponding to a width of the second cassette 20. The moving shaft 121 passes through upper portions of both side surfaces of the second holding part 120 and is connected, and the support shaft 124 passes through lower portions of the both side surfaces of the second holding part 120 and is connected. When the second holding part 120 is rotated forward or backward, the second holding part 120 may be rotated around the support shaft 124, and both ends of the moving shaft 121 may be moved along the guide holes 111 in the front-rear direction within a predetermined angle range. The second cassette 20 is inserted between the second holding part 120 and the support member 160, and the second holding part 120 supports a rear surface, both side surfaces, and a bottom surface of the second cassette 20.

A second connector connection unit 130 connected to the second connector 21 of the second cassette 20 is installed on a bottom surface of the second holding part 120.

The first holding part 140 is a component for holding the first cassette 10 having a relatively small volume, and a width between both side surfaces in the left-right direction thereof is formed to have a size corresponding to a width of the first cassette 10. A rotation shaft 144 (see FIG. 14) passing through in the lateral direction may be connected to both side surfaces of the first holding part 140 and both side surfaces of the second holding part 120, and the first holding part 140 may be rotated in the front-rear direction around the rotation shaft 144. The first cassette 10 is inserted between the first holding part 140 and the support member 160, and the first holding part 140 supports a rear surface, both side surfaces, and a bottom surface of the first cassette 10.

A first connector connection unit 150 connected to the first connector 11 of the first cassette 10 is installed on a bottom surface of the first holding part 140.

The support member 160 is a component for supporting a front portion of the first cassette 10 held on the first holding part 140 or a front portion of the second cassette 20 held on the second holding part 120, and the support shaft 124 passes through lower portions of both side surfaces in the lateral direction and is connected, and may be rotated in the front-rear direction around the support shaft 124. A handle part 161 may be provided above the support member 160 so that an operator may easily grip it.

The link member 170 is provided on both sides as a pair, and is a component for interconnecting both side surfaces of the second holding part 120 and both side surfaces of the support member 160 and adjusting an angle between the second holding part 120 and the support member 160. The second coupling members 172 relatively and rotatably coupled to both side surfaces of the second holding part 120 are provided on a rear end portion in a longitudinal direction of the link member 170, and the third coupling members 173 relatively and rotatably coupled to both side surfaces of the support member 160 are provided on a front end portion in the longitudinal direction of the link member 170. Further, a long hole 171 is formed in the link member 170 in the longitudinal direction of the link member 170, and the second coupling member 172 is supported inside the long hole 171 so as to be movable in a longitudinal direction of the long hole 171.

When the support member 160 is rotated forward as much as possible in order to hold the first cassette 10 or the second cassette 20 on the cassette holder 100, the second coupling member 172 is moved to a rear end portion of the long hole 171 and positioned, and the angle between the second holding part 120 and the support member 160 is maximized.

In the case in which the cassette holder 100 is not in use, when the support member 160 is rotated backward as much as possible, the second coupling member 172 is moved to a front end portion of the long hole 171 and positioned, and the angle between the second holding part 120 and the support member 160 is minimized and becomes a folded state.

Further, an angle between the first holding part 140 and the support member 160 is also adjusted according to the rotation of the support member 160 in the front-rear direction.

The first holding part 140 is provided so as to be rotatable in the front-rear direction between a first position in which the first holding part 140 is positioned at a front side of the second holding part 120 to hold the first cassette 10 on the first holding part 140, and a second position in which the first holding part 140 is positioned at a rear side of the second holding part 120 to hold the second cassette 20 on the second holding part 120.

FIGS. 5 to 7 illustrate states in which the first cassette 10 having a relatively small volume is held on the cassette holder 100, and illustrate states in which the first holding part 140 is rotated forward and moved to the first position.

FIGS. 8 to 10 illustrate states in which the second cassette 20 having a relatively large volume is held on the cassette holder 100, and illustrate states in which the first holding part 140 is rotated backward and moved to the second position. In this case, the first holding part 140 is rotated backward and positioned, and thus the second cassette 20 may be held on the second holding part 120 without interference with the first holding part 140.

FIGS. 11 and 12 illustrate states in which the support member 160 and the second holding part 120 are rotated toward an inner side of the frame 110 and folded after a banknote replenishment/collection operation is completed.

As illustrated in FIGS. 5 to 10, in the case in which the cassette holder 100 is in use, when the support member 160 is rotated forward, the second connector connection unit 130 is rotated forward in conjunction with the support member 160 so that the second connector connection unit 130 is positioned parallel to the front-rear direction.

As illustrated in FIGS. 11 and 12, in the case in which the cassette holder 100 is not in use, when the support member 160 is rotated backward, the second connector connection unit 130 is rotated backward in conjunction with the support member 160 so that the second connector connection unit 130 is positioned inside the frame 110 and is positioned parallel to the left-right direction. Accordingly, in the case in which the cassette holder 100 is not in use, a size occupied by the cassette holder 100 in the front-rear direction can be reduced.

The first connector connection unit 150 connected to the first connector 11 provided on the bottom surface of the first cassette 10 is provided in the first holding part 140, and the first connector connection unit 150 is provided so as to maintain an upright state when the first holding part 140 is positioned at the first position and the second position. In this way, by maintaining the upright state of the first connector connection unit 150 at the first position and the second position, the connection between the first connector connection unit 150 and the first connector 11 may be made in position, and misconnection and damage to parts that may be caused when the first connector connection unit 150 and the first connector 11 are not positioned in position in the process of connecting the first connector connection unit 150 and the first connector 11 can be prevented.

FIGS. 13 to 17 illustrate states in which the first holding part 140 is rotated forward to hold the first cassette 10 and is placed at the first position, and FIGS. 18 and 19 illustrate states in which the first holding part 140 is rotated backward to hold the second cassette 20 on the second holding part 120 and is placed at the second position.

Referring to FIGS. 13 and 14, the first holding part 140 is provided to be rotatable in the front-rear direction between the first position and the second position around the rotation shaft 144 connected to both side surfaces of the second holding part 120. Handle parts 140*a* may be provided at upper ends of both sides of the first holding part 140 so that the operator may easily grip them.

One side portion of a rotating member 143 is connected to the rotation shaft 144, a first support plate 141 is coupled to the bottom surface of the first holding part 140, and a connecting shaft 142 which passes through the first support plate 141 and is provided in the lateral direction is connected to another side portion of the rotating member 143 so as to enable relative rotation (idle rotation).

Referring to FIG. 15, a first fixing member for fixing and supporting the first holding part 140 in the state in which the first holding part 140 is rotated to the first position is provided. The first fixing member may be configured as a stopper member 146 which is provided at an upper end portion of a rear surface of the first holding part 140 and engaged to a front side plate 128 of the second holding part 120 in the state in which the first holding part 140 is rotated to the first position. A plurality of stopper members 146 may be provided on the upper end portion of the rear surface of the first holding part 140 to be spaced apart from left to right.

In the state in which the first holding part 140 is rotated to the first position, a front end portion of the stopper member 146 is engaged to a rear surface of the front side plate 128 and supported, and thus the first holding part 140 may not be further rotated forward from the first position and the position thereof may be fixed.

Referring to FIGS. 14 and 16, a second support plate 145 is coupled to one side surface of the rotating member 143, and a buffer member 191 for absorbing an impact caused by a collision with the second support plate 145 when the first holding part 140 is rotated to the first position may be provided.

The buffer member 191 may be made of a buffer material such as rubber, and a plurality of buffer members 191 may be provided at positions spaced left and right in a fixing bracket 190 coupled to the second holding part 120. The buffer member 191 functions as a first fixing member that absorbs an impact between the second support plate 145 and the fixing bracket 190 when the first holding part 140 is rotated to the first position, and allows the position of the first holding part 140 to be fixed without being further rotated forward from the first position.

Referring to FIG. 17, an arc-shaped guide groove 143*a* along a rotational direction of the rotating member 143 is formed in one side surface of the rotating member 143, and a guide pin 141*a* positioned to protrude toward an inner side of the guide groove 143*a* may be provided on the first support plate 141. According to this configuration, when the first holding part 140 is rotated in the front-rear direction between the first position and the second position, the first support plate 141 that is coupled to the bottom surface of the first holding part 140 and the rotating member 143 may be smoothly and relatively rotated each other along a set path, and when the first holding part 140 is placed at the first position or the second position, the first support plate 141 and the rotating member 143 may be supported so as not to be arbitrarily moved forward or backward.

Referring to FIGS. 18 to 21, a second fixing member for fixing and supporting the first holding part 140 in the state in which the first holding part 140 is rotated to the second position is provided. As illustrated in FIGS. 19 and 20, the second fixing member may include a magnetic substance 147 which is mounted on a rear surface of the first support plate 141 and attached to a rear side plate 127 of the second holding part 120 in the state in which the first holding part 140 is rotated to the second position.

In this way, in the state in which the first holding part 140 is rotated to the second position, the magnetic substance 147 provided in the first support plate 141 is attached to the rear side plate 127 of the second holding part 120 due to a magnetic force, and thus the second fixing member may support the first holding part 140 to maintain the state of being rotated to the second position, and fix the first holding part 140 so as not to be arbitrarily rotated forward from the second position.

Referring to FIG. 21, the second support plate 145 may be coupled to one side surface of the rotating member 143, and when the first holding part 140 is rotated to the second position, an engaging piece 145*a* formed on one side portion of the second support plate 145 may be engaged to a coupling part 141*b* formed on one side portion of the first support plate 141. The engaging piece 145*a* and the coupling part 141*b* function as second fixing members that allow the position of the first holding part 140 to be fixed without being further rotated backward from the second position.

Undescribed reference numerals 148 and 149 denote guide rods for guiding the first cassette 10 to be held on the first holding part 140 in position, and guide grooves (not illustrated) into which the guide rods 148 and 189 are inserted may be formed in the bottom surface of the first cassette 10.

A configuration in which the second connector connection unit 130 is rotated in the front-rear direction in conjunction with the rotation of the support member 160 in the front-rear direction will be described with reference to FIGS. 22 to 27.

The second connector connection unit 130 connected to the vertical second connector 21 provided on the bottom surface of the second cassette 20 is provided in the second holding part 120.

The second connector connection unit 130 is provided so as to be rotatable in both directions around a rotation shaft 182 between a third position in which the second connector connection unit 130 is positioned in the front of the second holding part 120 and a fourth position in which the second connector connection unit 130 is positioned in an inner side of the second holding part 120 by the action of the power transmission unit 180 interlocking with the rotation of the support member 160 in the front-rear direction.

FIGS. 22 to 24 illustrate states in which the second connector connection unit 130 is placed at the third position, and FIGS. 25 to 27 illustrate states in which the second connector connection unit 130 is placed at the fourth position.

Referring to FIGS. 22 to 24, the support member 160 may be rotated in the front-rear direction around the support shaft 124, and a coupling groove part 163 is formed in a front surface of a lower end portion of the support member 160. When the support member 160 is rotated forward, that is, when an upper portion of the support member 160 positioned above the support shaft 124 relative to the support shaft 124 is rotated forward, a lower portion of the support member 160 positioned below the support shaft 124 is rotated backward.

A fixing bracket 181 may be provided on the bottom surface of the second holding part 120, a support bracket 131 that supports the second connector connection unit 130 is provided above the fixing bracket 181, and the rotation shaft 182 passes through one side portions of the fixing bracket 181 and the support bracket 131 and is connected. Therefore, the support bracket 131 may be rotated between the third position and the fourth position around the rotation shaft 182. An elastic member 183 that applies an elastic force to allow the support bracket 131 to be rotated in a direction of the third position is provided in a periphery of the rotation shaft 182.

A plurality of gears 184, 185, and 186 that rotate the second connector connection unit 130 in conjunction with the rotation of the support member 160 in the front-rear direction are included on a lower portion of the rotation shaft 182. The plurality of gears 184, 185, and 186 may include a first gear 184 which is rotated around a first gear shaft 184*a* and in which a coupling rod part 184*b* engaged to the coupling groove part 163 formed at the lower portion of the support member 160 is formed on one side portion thereof, a second gear 185 which is gear-connected to the first gear 184 and rotated around a second gear shaft 185*a*, and a third gear 186 which is gear-connected to the second gear 185 and rotated around the rotation shaft 182.

As illustrated in FIGS. 22 and 23, when the support member 160 is rotated forward around the support shaft 124, the coupling groove part 163 formed at the lower portion of the support member 160 is moved to the rear where the engagement with the coupling rod part 184*b* formed on the first gear 184 is released, and in this case, the support bracket 131 and the second connector connection unit 130 mounted thereon are rotated to the third position due to the elastic force of the elastic member 183. In this way, when the second connector connection unit 130 is placed at the third position, the second connector connection unit 130 is positioned to correspond vertically to the vertical second connector 21 of the second cassette 20.

A stop pin 132 is formed on one side portion of the support bracket 131 to protrude therefrom, and when the support bracket 131 is rotated to the third position, the stop pin 132 may be engaged to an engaging end 120*a* positioned on a front surface of a lower end portion of the second holding part 120 to support the support bracket 131 so as not to further rotate more than the third position.

FIG. 24 illustrates a direction in which the first to third gears 184, 185, and 186 are rotated in association with the support member 160 when the support member 160 is rotated forward, with an arrow.

Referring to FIGS. 25 to 27, when the support member 160 is rotated backward around the support shaft 124, the coupling groove part 163 formed at the lower portion of the support member 160 is engaged to the coupling rod part 184*b* formed on the first gear 184 and pushes the coupling rod part 184*b* forward. In this case, the first to third gears 184, 185, and 186 are interlocked and rotated as shown by arrow in FIG. 27, and thus the support bracket 131 and the second connector connection unit 130 mounted thereon are rotated backward around the rotation shaft 182 and positioned in the inner side of the second holding part 120 in parallel to the left-right direction.

Undescribed reference numeral 133 denotes a guide rod for guiding the first cassette 20 to be held in the position of the second holding part 120, and a guide groove (not illustrated) into which the guide rod 133 is inserted may be formed in the bottom surface of the second cassette 10.

According to the cassette holder for the automated teller machine according to the present invention, cassettes of different sizes can be held using one holder in common, and the cassette holder for the automated teller machine according to the present invention can be applied interchangeably to connectors disposed in different positions and directions on different cassettes.

Further, in a state in which a first holding part for holding a relatively small cassette is rotated forward or backward, a connector is fixed in an upright state and has an impact absorbing function so that a connection between the connector of the cassette and a connector connection unit of the cassette holder can be stably made, and thus damage to parts caused when the connector is connected can be prevented.

Further, a second connector connection unit is configured to be rotated to and positioned at a front side of a frame when the cassette holder is in use, and is configured to be rotated backward and inserted into an inner side of the frame when the cassette holder is not in use, and thus a size occupied by the cassette holder protruding outward from one side surface of the automated teller machine can be reduced.

As described above, the present invention is not limited to the embodiments described above, and it will be understood that various modifications may be made by those skilled in the art to which the invention pertains without departing from the technical spirit of the present invention claimed in the appended claims and such modifications are within the scope of the present invention.

What is claimed is:

1. A cassette holder for an automated teller machine, comprising:

a first holding part configured to hold a first cassette having a predetermined volume; and a second holding part in which the first holding part is connected to an inner side thereof and which is configured to hold a second cassette having a larger volume than the first cassette, wherein the first holding part is moved in a front-rear direction between a first position in which the first holding part is positioned at a front side of the second holding part to hold the first cassette on the first holding part and a second position in which the first holding part is positioned at a rear side of the second holding part to hold the second cassette on the second holding part.

2. The cassette holder of claim 1, further comprising:

a frame configured to support the first holding part and the second holding part;

a support member which supports a front surface of the first cassette or the second cassette and is rotatable in a front-rear direction around a support shaft connected in a lateral direction to a lower portion of the frame; and a link member having both ends which are rotatably connected to the second holding part and the support member so that an angle between the second holding part and the support member is adjusted.

3. The cassette holder of claim 2, wherein the first cassette is inserted between the first holding part and the support member and the first holding part supports a rear surface, both side surfaces, a bottom surface of the first cassette, and the second cassette is inserted between the second holding part and the support member and the second holding part supports a rear surface, both side surfaces, a bottom surface of the second cassette.

4. The cassette holder of claim 2, wherein a lower portion of the second holding part is provided so as to be rotatable in a front-rear direction around the support shaft and a moving shaft is coupled to an upper portion of the second holding part in a lateral direction, and both ends of the moving shaft are provided to be movable within a predetermined angle range in the front-rear direction within guide holes formed in both side surfaces of an upper portion of the frame in the front-rear direction.

5. The cassette holder of claim 2, wherein a first connector connection unit connected to a first connector provided on a bottom surface of the first cassette is provided in the first holding part, and the first connector connection unit is provided to maintain an upright state when the first holding part is positioned in the first position and the second position.

6. The cassette holder of claim 5, wherein the first holding part is provided to be rotatable in the front-rear direction between the first position and the second position around a rotation shaft connected to both side surfaces of the second holding part.

7. The cassette holder of claim 6, wherein one side portion of a rotating member is connected to the rotation shaft, a first support plate is coupled to a bottom surface of the first holding part, and a connecting shaft that passes through the first support plate and is provided in the lateral direction is connected to another side portion of the rotating member so as to be relatively rotatable.

8. The cassette holder of claim 7, wherein a first fixing member that fixes and supports the first holding part in a state in which the first holding part is rotated to the first position is provided, and the first fixing member includes a stopper member which is provided on an upper end portion of the first holding part and engaged to a front side plate of the second holding part in the state in which the first holding part is rotated to the first position.

9. The cassette holder of claim 8, wherein a second support plate is coupled to one side surface of the rotating member, and the cassette holder further includes a buffer member configured to absorb an impact caused by a collision with the second support plate when the first holding part is rotated to the first position.

10. The cassette holder of claim 7, wherein a second fixing member that fixes and supports the first holding part in a state in which the first holding part is rotated to the second position is provided, and the second fixing member includes a magnetic substance which is mounted on a rear surface of the first support plate and attached to a rear side plate of the second holding part in the state in which the first holding part is rotated to the second position.

11. The cassette holder of claim 10, wherein a second support plate is coupled to one side surface of the rotating member, and when the first holding part is rotated to the second position, an engaging piece formed on one side portion of the second support plate is engaged to a coupling part formed on one side portion of the first support plate.

12. The cassette holder of claim 7, wherein an arc-shaped guide groove along the rotational direction of the rotating member is formed in one side surface of the rotating member, and a guide pin positioned to protrude toward an inner side of the guide groove is provided on the first support plate.

13. The cassette holder of claim 2, wherein a first connector connection unit connected to a first connector provided on a bottom surface of the first cassette to have a length in one direction is provided in the first holding part, and a second connector connection unit connected to a second connector provided on a bottom surface of the second cassette to have a length in a direction different from that of the first connector is provided in the second holding part.

14. The cassette holder of claim 13, wherein the second connector connection unit is provided so as to be rotatable in both directions around a rotation shaft between a third position in which the second connector connection unit is positioned in a front of the second holding part and a fourth position in which the second connector connection unit is positioned in an inner side of the second holding part in conjunction with the rotation of the support member in the front-rear direction.

15. The cassette holder of claim 14, wherein, when the support member is rotated forward, the second connector connection unit is rotated toward the front of the second holding part due to action of an elastic force of an elastic member so that the second connector connection unit corresponds vertically to the second connector of the second cassette and is positioned to be connectable, and when the support member is rotated backward, the second connector connection unit is rotated and positioned toward an inner side of the second holding part by power transmission due to a plurality of gears interlocking with the support member.

* * * * *